Jan. 3, 1933.    Z. V. KUCHAN    1,893,418
AUTOMOBILE JACK
Filed July 9, 1928    5 Sheets-Sheet 1
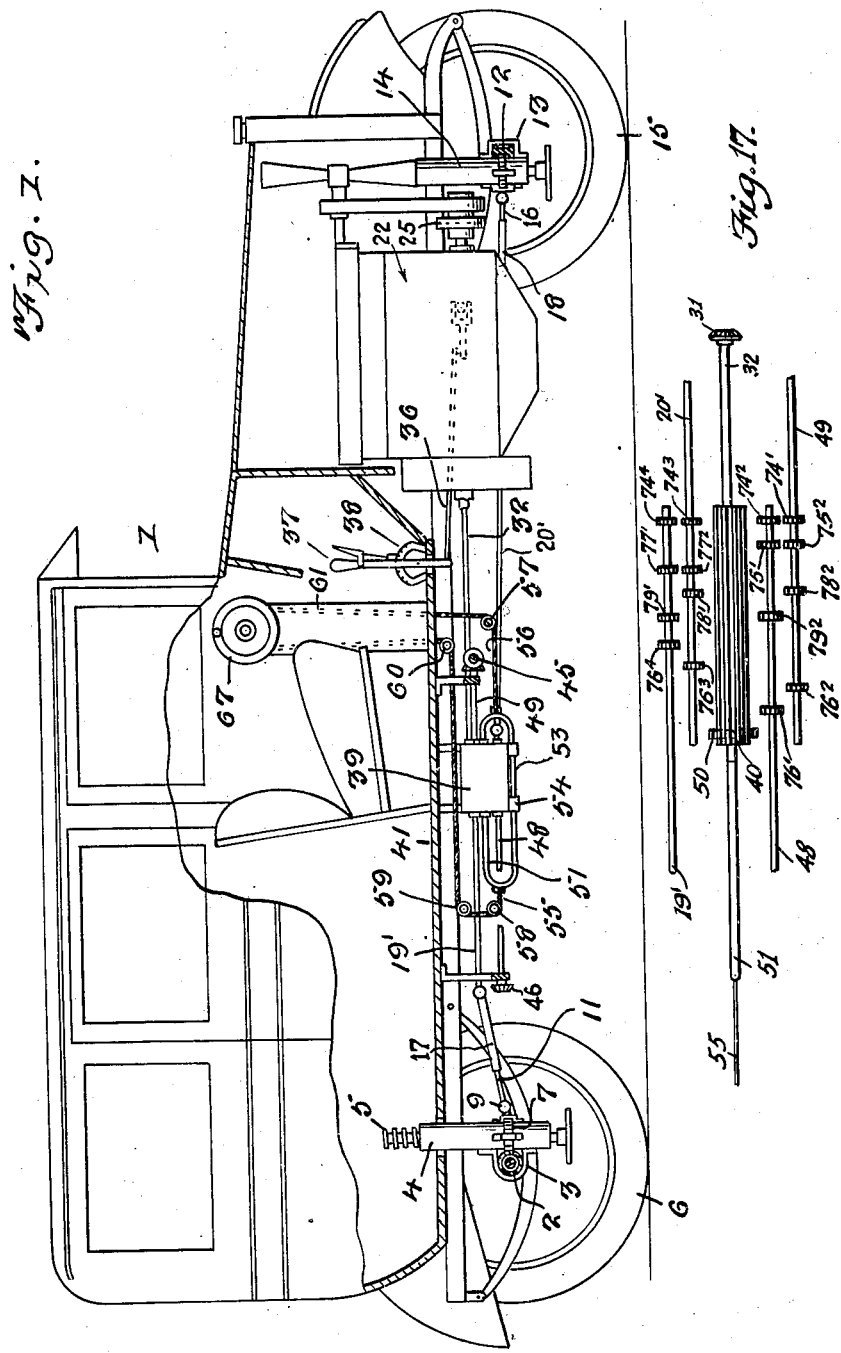
Z. V. Kuchan  INVENTOR
BY Victor J. Evans  ATTORNEY

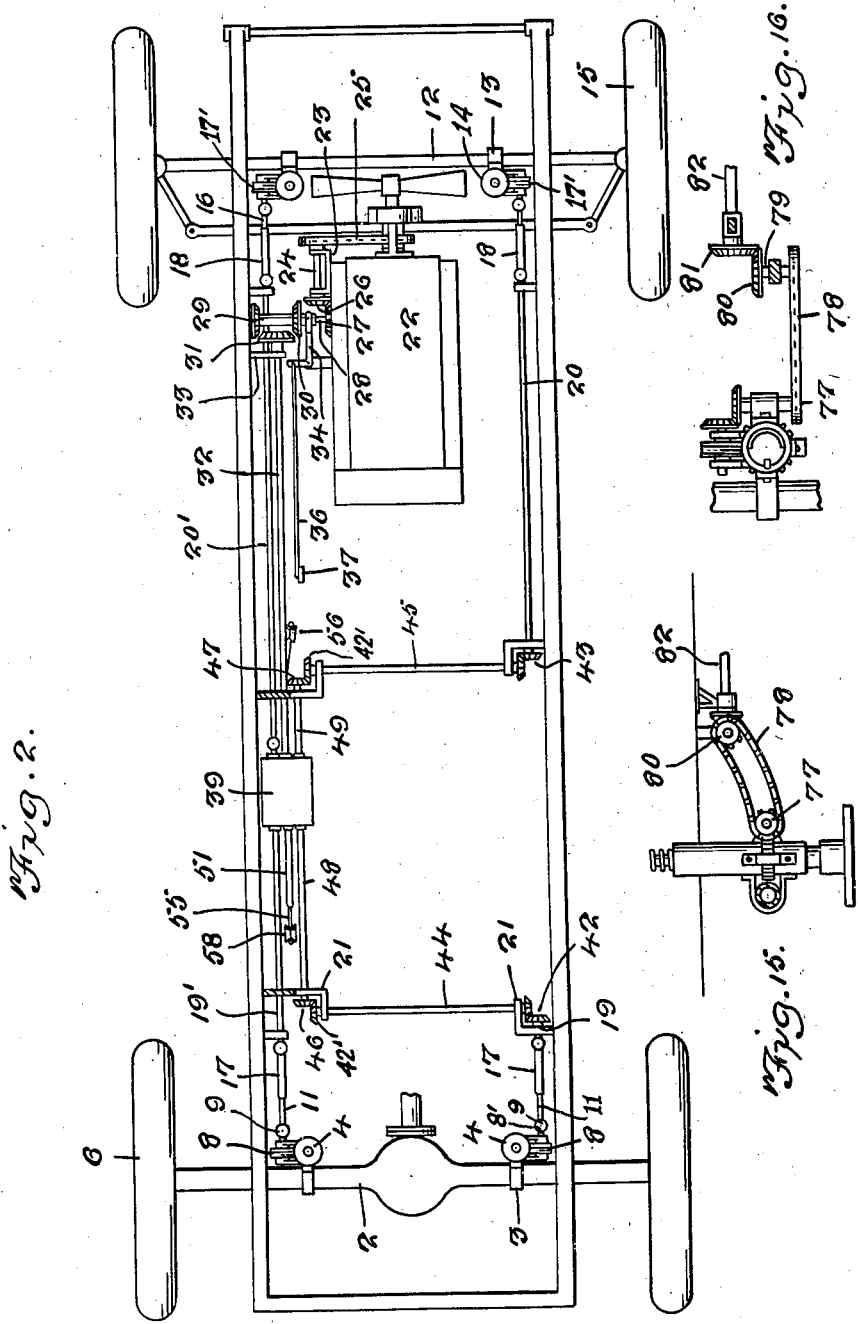

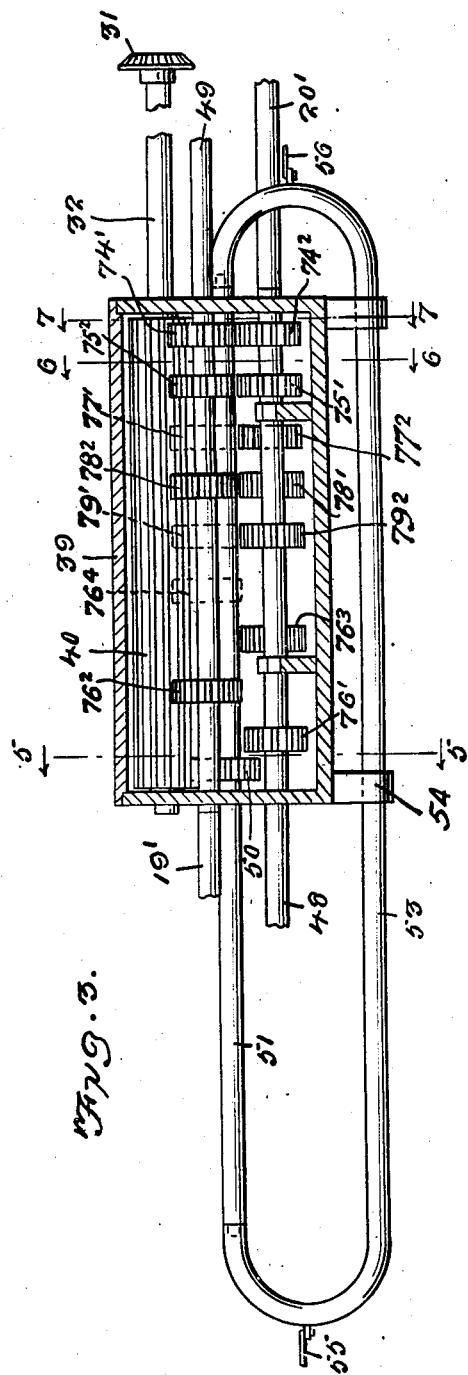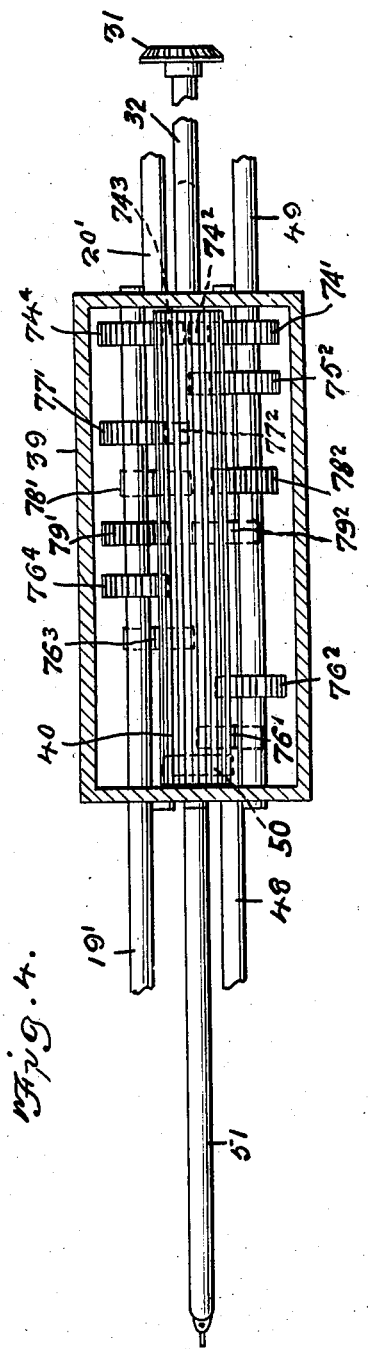

Jan. 3, 1933.   Z. V. KUCHAN   1,893,418
AUTOMOBILE JACK
Filed July 9, 1928    5 Sheets-Sheet 4
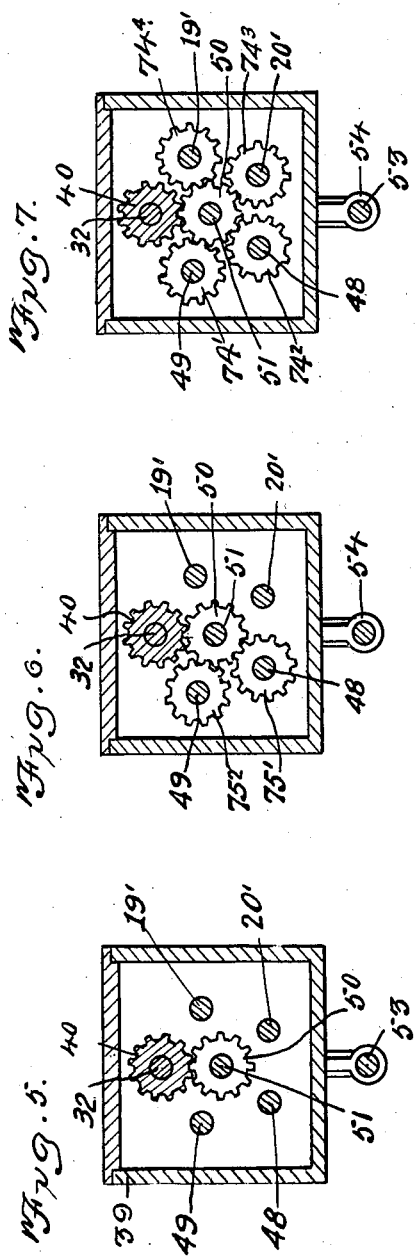
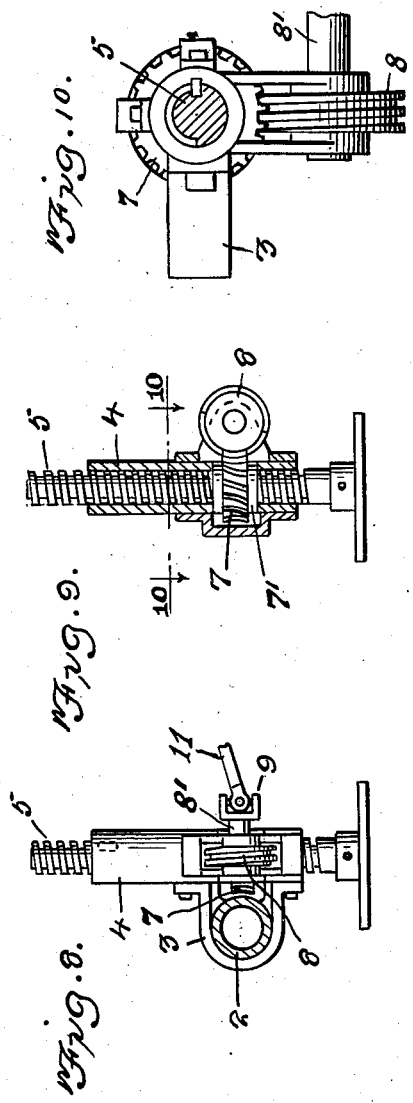
Z. V. Kuchan
INVENTOR
BY Victor J. Evans
ATTORNEY

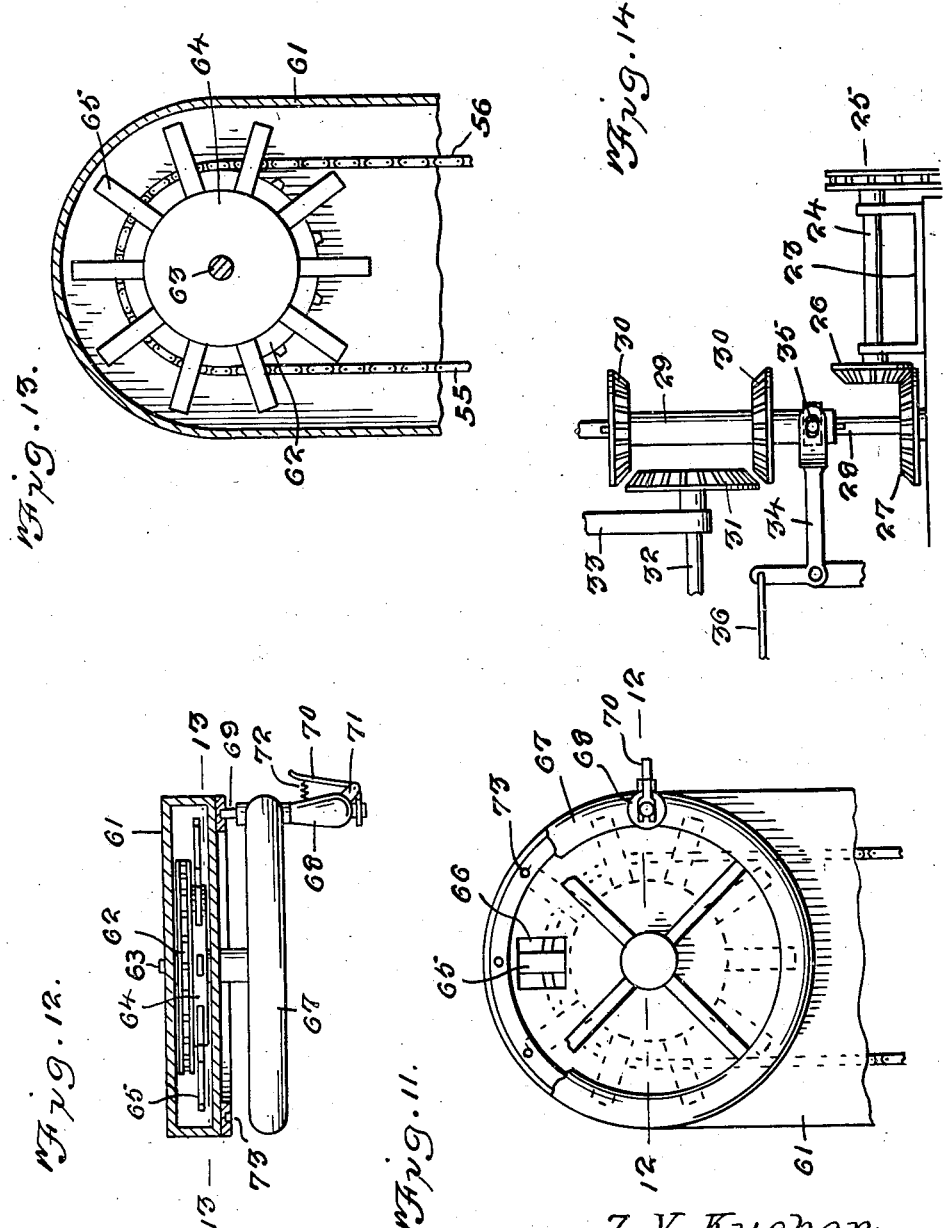

Patented Jan. 3, 1933

1,893,418

UNITED STATES PATENT OFFICE

ZANON VICTOR KUCHAN, OF ABERDEEN, WASHINGTON

AUTOMOBILE JACK

Application filed July 9, 1928. Serial No. 291,317.

The object of the invention is to provide a jack equipment for incorporation in an auto vehicle as a part of the permanent equipment thereof and so arranged with a jack adjacent each wheel that any wheel may be elevated from the ground independently of the others, the two wheels on either side elevated together, or the front and rear wheels elevated simultaneously, so that the vehicle may be raised from the ground to protect the tires from the deleterious effects of long standing; to provide an equipment of the kind indicated which may be operated from the interior of the vehicle in such a way that the operator may readily select the jack or jacks desired to be operated; to provide a jack equipment actuable from the vehicle engine; and generally to provide an equipment for the elevation of a vehicle or any particular wheel or wheels thereof which is reduced to its simplest form when the number of operations it is designed to carry out are considered.

With this object in view, the invention consists in a construction and combination of parts of which a preferred embodiment is illustrated in the accompanying drawings, wherein:

Figure 1 is a view partly in elevation and partly in section of a motor vehicle showing the invention incorporated.

Figure 2 is a top plan view of the chassis of such a vehicle.

Figure 3 is a longitudinal vertical sectional view through the gear housing.

Figure 4 is a longitudinal horizontal sectional view through said gear housing.

Figures 5, 6 and 7 are sectional views on the planes indicated by the lines 5—5, 6—6 and 7—7 respectively of Figure 3.

Figure 8 is an elevational view of one of the jacks, the connected axle being shown in section.

Figure 9 is a vertical sectional view of the structure of Figure 8.

Figure 10 is a sectional view on the plane indicated by the line 10—10 of Figure 9.

Figure 11 is an elevational view, partly broken away, of the gear shifting means.

Figure 12 is a sectional view on the plane indicated by the line 12—12 of Figure 11.

Figure 13 is a sectional view on the plane indicated by the line 13—13 of Figure 12.

Figure 14 is a plan view of the operative connections between the vehicle engine and the jack actuating shaft.

Figure 15 is an elevational view of a modified form of individual jack actuating means.

Figure 16 is a top plan view of the structure of Figure 15.

Figure 17 is a view showing the jack drive shaft and the individual shafts for the several jacks laid in a common plane for the sake of clarity in determining the operation.

The vehicle 1 carries on its rear axle 2, to which they are secured by means of the clamps 3, lifting jacks comprising cylinders 4 which are fixed with reference to the axle but which house lifting legs in the form of screws 5 to which movement is imparted by means of nuts 7' incorporating as part of their structure the worm wheels 7, these latter being in mesh with worms 8 carried on stub shafts 8'. The jacks are positioned inside of the rear wheels 6.

The stub shafts 8' are provided with universal joints 9 to which are connected the sections 11 of sectional shafts, the other sections 17 of which telescope the sections 11 but are keyed thereto, so that there may be relative axial movement of the sections but not relative angular movement.

Similar jacks are provided on the forward axle 12, these jacks being indicated at 14 and being secured to the axle inside of the wheels 15 by means of clamps 13 and having jack leg engaging nuts similar to the nuts 7' but driven from worm wheels 17' which are in turn driven by extensible shafts composed of the telescopically connected sections 16 and 18 keyed for relative axial movement but to prevent relative angular or turning movement.

It is obvious that rotary movement imparted to any one or more of said extensible shafts will result in the lowering of the lifting legs of the jacks or their elevation, depending on the direction in which said extensible shafts are turned.

All of said extensible shafts are operatively connected with a power shaft 32, so that any one or more may be driven when the power shaft is driven and the latter is designed to be actuated from the vehicle motor 22 which has a chain drive 25 with a shaft 24, the latter being mounted in bearings in a bracket 23 and carrying at its rear end a bevel pinion 26 in mesh with a bevel pinion 27, the latter being carried on a shaft 28 journalled in appropriate bearings in the chassis and motor respectively. Mounted on the shaft 28 is a sleeve 29, this sleeve being movable axially of the shaft 28 but not angularly thereof. At remote ends, there are mounted on the sleeve the bevel gears 30 designed to mesh one or the other with the bevel gear 31 which is carried at the forward end of the power shaft. The sleeve 29 is shifted on the shaft 28 by means of the bell crank lever 34 the resistance arm of which is forked as at 35 and arranged in straddling relation with the projecting end of the sleeve, so that when the arm is rocked, the sleeve may be shifted axially. The connection between the forked end of the bell crank lever 34 and the sleeve consists of a collar mounted on the latter and angularly but not axially movable with respect thereto, this collar having radial pins entering slots in the fingers of the fork. To the force arm of the bell crank lever, there is connected a link 36 terminally connected with a hand lever 37 designed to be rocked to effect rocking of the bell crank lever and hence shifting of the sleeve 29.

Since the direction of rotation of the shaft 28 is continuously in one direction and since for the purpose of this invention it is necessary that the power shaft 32 rotate in either direction, the construction which permits the shifting of the sleeve to mesh one or the other of the gears 30 with the gear 31 provides for the rotation of the shaft 32 either in one direction or the other, despite the fact that the shaft 28 rotates only in one direction.

The power shaft 32 is mounted at its forward end in an appropriate bearing in the bracket 33 and at its rear end is journalled in the end walls of a casing 39, supported from the chassis below the floor 41 of the vehicle and interior to this casing carries a longitudinally toothed drum which is in effect a gear having a breadth of face equal to the length of the casing 39. A plurality of shafts are journalled in the end walls of the casing 39 and arranged in a circular series around the idler gear shaft 51 which is also journalled in the end walls of the casing, the power shaft 32 being one of this circular series and the other shafts being indicated at 19', 20', 48 and 49. These shafts 19', 20', 48 and 49 constitute the means for communicating motion to the extensible shafts when they are driven from the drive shaft in the manner hereinafter explained.

The shaft 20' is directly connected to the extensible shaft of the jack at the forward left hand side of the chassis frame, while the shaft 19 is directly connected with the extensible shaft of the jack at the corresponding rear end of the chassis frame. The shaft 48 is operatively connected to the extensible shaft of the jack at the opposite rear side of the chassis frame, its rear end being journalled in a bearing in a bracket 21 in which is also journalled one end of a transverse shaft 44, the opposite end of which is journalled in a similar bracket in the opposite side of the frame. A bevel gear 46 at the rear end of the shaft 48 meshes with a bevel gear 42' on the shaft 44 and the latter has a similar bevel gear couple 42 operatively connecting it with the extensible shaft of the jack at the rear right hand side of the frame.

The jack at the forward right hand side of the frame is actuated from the shaft 49, the latter having operative connections with its extensible shaft consisting of a bevel gear couple 47—42' connecting it with the transverse shaft 45 which through a bevel gear couple 43 is operatively connected with the shaft 20 by which the extensible shaft of the right hand forward jack is driven.

It is obvious that if motion be imparted to any one of the shafts 19', 20', 48 or 49, the associated jack will be actuated.

To provide for actuating the jacks singly or in pairs or all together, the idler shaft 51 which is movable axially in the casing, is provided with a pinion 50 always in mesh with the toothed drum 40, so that when the drum is rotating, as it will be when the shaft 32 is rotating, motion will be imparted to the gear 50 and from it transmitted to any one of the shafts 19', 20', 48 or 49, depending on the position of the gear 50 axially of the casing, since it will then mesh with gears on these different shafts.

Interior to the casing, the shaft 19', carries the pinions $76^4$, $79'$, $77'$ and $74^4$. The shaft 20' carries the pinions $76^3$, $78'$, $77^2$ and $74^3$. The shaft 46 carries the pinions $76'$, $79^2$, $75'$ and $74^2$, while the shaft 49 is provided with pinions $76^2$, $78^2$, $75^2$ and $74'$. The pinions on these various shafts are so positioned on the latter that the pinions $76^4$, $76^3$, $76'$ and $76^2$ all lie in different vertical planes. The pinions $79'$ and $79^2$ lie in a common vertical plane, as do the pinions $78'$ and $78^2$. The pinions $77'$ and $77^2$ lie in a common vertical plane as do also the pinions $75'$ and $75^2$. The pinions $74'$, $74^2$, $74^3$ and $74^4$ all lie in a common vertical plane.

With the shaft 32 rotating, motion may be communicated singly and selectively to impart motion to the shafts 19', 20', 48 and 49, by shifting the idler shaft to bring the gear 50 into mesh with the pinion $76'$, $76^2$, $76^3$ or $76^4$. The shafts 19' and 48 may be actuated simultaneously by further shifting the gear 50 until it meshes with the pinions 79′ and 79². Or the shafts 20′ and 49 may be actuated simultaneously by bringing the gear 50 into mesh with the pinions 78′ and 78². The shafts 19′ and 20′ and the shafts 48 and 49 may be operated simultaneously in pairs by bringing the gear 50 into mesh with the pinions 77′ and 77², or into mesh with the pinions 75′ and 75². All four of the shafts 19′, 20′, 48 and 49 will be operated simultaneously when the gear 50 is brought into mesh with the pinions 74′, 74², 74³ and 74⁴.

When the shafts 19′, 20′, 48 and 49 are operated independently, the connected jack is actuated. When the shafts 19′ and 48 are operated simultaneously the two rear jacks are actuated. When the shafts 20′ and 49 are operated simultaneously the two forward jacks are actuated. When the shafts 19′ and 20′ are operated the front and rear left jacks are actuated and when the shafts 48 and 49 are operated the front and rear right jacks are actuated. When all the shafts are operated all of the jacks are obviously actuated and will either be extended to perform the elevating function or retracted to raise them to inoperative position, depending on the direction of rotation of the drive shaft 32.

To provide for shifting movement of the idler shaft 51 and its associated gear 50 which is secured on said shaft, the shaft 51 is terminally formed with pilots which are journalled in the ends of a yoke frame 53, the latter being slidably mounted in bearings 54 carried on the under side of the casing 39. The yoke frame is mounted for sliding movement in its bearings, so as to impart axial movement to the shaft 51 and thus effect the gear meshing operations above described. To provide for this sliding movement of the yoke frame, a sprocket wheel 62 enclosed in a housing 61 is mounted interior to the vehicle, the sprocket wheel being fixed to a shaft 63 which is journalled in the front and rear walls of the housing 61. Over the sprocket wheel 62 is trained a chain the terminals 55 and 56 of which are connected to the ends of the frame 53, the forward terminal 56 being trained over a direction pulley 57 and the rear terminal over direction pulleys 58, 59 and 60. Obviously, if the sprocket wheel be rotated, axial movement will be imparted to the frame.

To provide for rotation of the sprocket wheel, the shaft 63 carries a hand wheel 67 with which is connected a handle 68, the latter carrying a latch pin 69 actuable through the instrumentality of a lever 70, fulcrumed at 71 on the handle and yieldingly impelled in one direction by means of the spring 72. The latch pin is designed for selective engagement with any one of the sockets 73 on the front of the housing or casing 61. When so engaged, the sprocket wheel is locked against turning movement. To impart movement to the sprocket wheel, lateral pressure applied on the latch lever 70 will release the latch, so that the wheel 67 may be turned by means of the handle 68 and the desired movement thus imparted to the yoke frame 53.

In order that the operator may know how or in what direction to shift the sprocket wheel so as to effect the meshing of the desired gears in the casing 39, there is mounted in common with the sprocket wheel a drum 64 provided with the radial arms 65 on which it is intended the indicia may be inscribed to indicate the position of the yoke frame. The arms 65 are visible through a window 66 in the front wall of the casing 61. One of the arms 65 carries an indication to show that the jacks are in inoperative position. The remaining arms indicate which of the jacks singly is in operative position, which pair are in operative position and when all four are in operative position.

Instead of the extensible shafts for the immediate jack operation, there may be substituted chains, such as those indicated at 78 in Figures 15 and 16. These chains are trained over sprockets on the short shafts 77 and 79 of which the former effects rotation of the lifting leg nut and the latter is driven from a shaft 82 by reason of a miter gear connection indicated at 80 and 81. In substituting this construction for the extensible shafts, the shafts 82 would be operatively connected with the shafts 20, 44, 19′ and 20′.

Having described the invention, I claim:

A means for operating screw jacks which are attached to the front and rear axles of an automobile adjacent to the sides of the frame of the said automobile, whereby the jacks at the side, front or rear, may be independently operated or all of the jacks simultaneously operated, and wherein said operating means is actuated by the engine of the automobile, the means comprising a casing, a shaft journaled through the casing, means between the shaft and the engine for driving the shaft in either of two directions and for holding the shaft from turning, said shaft having an elongated gear fixed thereon and which gear is arranged in the casing, shafts journaled through the casing extending in opposite directions therefrom, and the said shafts when operated being adapted to raise or lower the respective jacks, means connecting the jacks and jack operating shaft, spaced gears fixed on the shafts at the portions thereof in the casing, a shift shaft movable through the casing and disposed intermediate with respect to the jack operating shafts and having a gear fixed thereon, a yoke having rounded ends providing bearings for the ends of the shift shaft, flexible elements connected with the ends of the yoke, and means to which the flexible elements are connected for exerting a pulling action on either of the flexible elements to move the yoke and the shift shaft longitudinally in either of two directions whereby to bring the gear on the shift shaft to mesh with certain of the gears on the jack operating shafts to cause certain or all of the jack operating shafts to turn and to operate the jacks.

In testimony whereof I affix my signature.

ZANON VICTOR KUCHAN.